(12) United States Patent
Irving (10) Patent No.: US 9,971,118 B1
(45) Date of Patent: May 15, 2018

(54) LAUNCH CABLE ASSEMBLY

(71) Applicant: FiberNext, LLC, Concord, NH (US)

(72) Inventor: Ryan M. Irving, Belmont, NH (US)

( * ) Notice: Subject to any disclaimer, the term of this patent is extended or adjusted under 35 U.S.C. 154(b) by 192 days.

(21) Appl. No.: 14/688,032

(22) Filed: Apr. 16, 2015

Related U.S. Application Data (63) Continuation-in-part of application No. 14/453,055, filed on Aug. 6, 2014, now Pat. No. 9,310,275.

(51) Int. Cl.
*G02B 6/44* (2006.01)

(52) U.S. Cl.
CPC .................................. *G02B 6/4457* (2013.01)

(58) Field of Classification Search
CPC .................................................... G02B 6/4457
See application file for complete search history.

(56) References Cited

U.S. PATENT DOCUMENTS

| | | | | |
|---|---|---|---|---|
| 7,229,042 | B2 * | 6/2007 | Thebault | G02B 6/4457 242/388.1 |
| 8,090,234 | B2 * | 1/2012 | Marcouiller | G02B 6/4471 385/134 |
| 8,837,940 | B2 * | 9/2014 | Smith | G02B 6/483 398/42 |
| 2012/0025005 | A1 * | 2/2012 | Smith | B65H 75/146 242/603 |
| 2014/0254986 | A1 * | 9/2014 | Kmit | H04Q 11/0067 385/55 |
| 2015/0177473 | A1 * | 6/2015 | Smith | G02B 6/4457 385/134 |

* cited by examiner

*Primary Examiner* — Ryan Lepisto
(74) *Attorney, Agent, or Firm* — Catherine E. Napjus; Michael J. Persson; Lawson, Persson & Chisholm, PC (57) ABSTRACT

A housing for a launch cable assembly with a cylindrical exterior comprising first and second flat round sides; a height between the first and second sides; a division along a perimeter; a first part comprising the first side and a portion of the height left of the division; and a second part comprising the second side and a portion of the height right of the division, wherein the first and second parts are removably affixable to one another; an interior space; at least two round mandrels within the interior space; and at least two cord exits.

16 Claims, 8 Drawing Sheets

LAUNCH CABLE ASSEMBLY

CLAIM OF PRIORITY

This application is a continuation in part of and claimed the benefit of priority of co-pending U.S. application Ser. No. 14/453,055, filed on Aug. 6, 2014, which claims the benefit of priority of U.S. Provisional Patent Application Ser. No. 61/863,002, filed on Aug. 7, 2013.

FIELD OF THE INVENTION

The present invention relates to fiber test equipment, and in particular, to an improved launch cable assembly for use with an MPO switch and an OTDR.

BACKGROUND

An optical time-domain reflectometer (OTDR) is a useful tool for testing point-to-point fiber optic links, testing passive optical networks (PONs), and finding faults, such as breaks and measure reflectance or optical return loss (ORL) in fiber optic networks. The OTDR generates output pulses and measures the return signal from the same end of the fiber network under test.

Figure 2A:
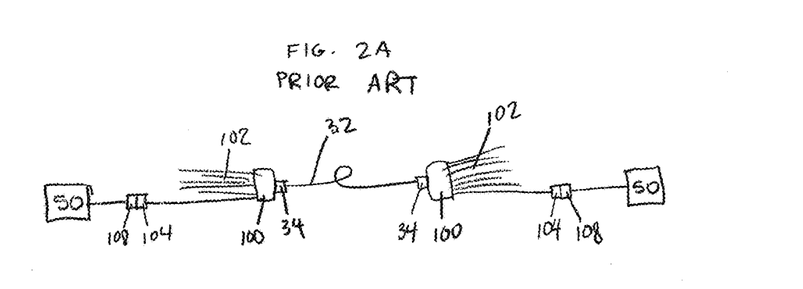
FIG. 2A is a diagram of a prior art set up for using an OTDR to test a multi-fiber cable.

A current standard method for using an OTDR to test a multi-fiber cable 32 terminating in an MPO connector 34 is illustrated in FIG. 2A. The MPO connector 34 is plugged into a breakout assembly 100 that optically connects each fiber strand within the multi-fiber cable 32 with a separate optical fiber strand 102 within the breakout assembly 100. These optical fiber strands 102 within the breakout assembly 100 then emerge from the other side of the breakout assembly 100 and each strand 102 ends in a single fiber connector 104 after a short distance from their exit from the breakout assembly 100. An OTDR cable 106 as long as 500 feet may extend from an OTDR 50 and end in a port 108 that accepts the single fiber connector 104 that terminates each of the fiber strands 102 extending from the breakout assembly 100. A user would plug the MPO connector 34 of the multi-fiber cable 32 being tested into the breakout assembly 100; plug the single fiber connector 104 into the port 108 of the cable 106 extending from the OTDR 50; and then operate the OTDR 50.

The user would repeat this process for all of the strands extending from the breakout assembly. This may be as few as two, and as many as twenty-four or more. The user must be careful to not mix up the strands that have been tested with those that haven't, and keep careful track of which strand is which so the user knows which strand within the multi-fiber cable is being tested. This is an unwieldy and confusing assembly and process. Moreover, because of the short distance between the connection of the multi-fiber cable 32 being tested with the breakout assembly 100 and the connection of the single fiber connector 104 with the OTDR cable 106, the OTDR 30 cannot accurately test the connector loss of the end MPO connector 34 of the multi-fiber cable 32 under test that is connected to the breakout assembly 100. Because the connector 34 under test and the single fiber connector 104 are so close in distance, the OTDR will read the connector loss of both connections as one big loss, and it is impossible to attribute the correct amount of that loss to the test connector 34 alone. In essence, the OTDR 30 cannot "see" that end connector 34 of the cable under test 32 when it is so close to another connection, such as single fiber connector 104. One solution to this problem might be to make the fiber strands 102 extending from the breakout assembly 100 at least 100 feet long. This would only make the already unwieldy assembly more unwieldy, however.

Current art does have a solution to the problem of having to check each strand extending from the breakout assembly, strand by strand, in the correct order. All of the strands extending from the breakout assembly may be brought back together to terminate in an MPO connector that is then plugged into an MPO switch, which is connected to the OTDR. The MPO switch can automatically direct the pulses coming from the OTDR into the separate strands, so that the user may test each of the individual strands of the multi-fiber cable connected to the breakout assembly without having to physically connect, strand by strand. Not only is this time-saving and less confusing, but it also avoids connector damage from repeated connecting and disconnecting. The use of an MPO switch does not solve the problem of the OTDR not being able to see the end connector of the multi-fiber cable under test, however.

Therefore there is a need for an improved assembly that is both easy to use and that allows the OTDR to test the end connector of a cable under test.

SUMMARY OF THE INVENTION

The present invention is a housing for a launch cable assembly and a launch cable assembly.

In its most basic form, the launch cable assembly includes a mandrel within the housing that includes at least one cable port, and at least two fiber optic strands of at least 25 feet in length wrapped around the mandrel, where the first end of the strands is in optical communication with the inner side of the port on the inside of the housing, and where the second end of the strands extends out of the housing and is grouped together to terminate in a standard connector, which is preferably an MPO connector. The outer side of the port is designed to accept any standard fiber optic cable connector, particularly MPO connectors. The fiber optic strands are arranged in optical communication with the port on the inside of the housing so that when a multi-fiber optic cable terminating in an MPO connector is plugged into the port, light traveling through the fiber optic strands within the housing will continue traveling through the fiber optic strands within the multi-fiber cable plugged into the port, and vice versa.

In preferred embodiments of the launch cable assembly, the at least two fiber optic strands are twelve fiber optic strands and the multi-fiber optic cable that is plugged into the port is a twelve fiber optic cable. In an alternate preferred embodiment of the launch cable assembly the at least two fiber optic strands are twenty-four fiber optic strands and the multi-fiber optic cable that is plugged into the port is a twenty-four fiber optic cable. It is understood that there may also be more than twenty-four strands. The two to twenty-four fiber optic strands wrapped around the mandrel may be enclosed in a loose tube cable or a ribbon cable, although loose tube cable is preferred as the inventor has found that it is difficult to get the ribbon cable to route properly in this application. In addition, loose tube cable has more capacity than ribbon cable, and has longer length in a smaller space. Having the fibers completely loose, i.e. not encapsulated in any cable, is preferred over both loose tube cable and ribbon cable, however. The strands are organized so that their ends connect with the port on one end and into an MPO connector on the other end, and wrapped around the mandrel in the middle.

Although the length of the strands is at least 25 feet, it is preferred that the length be at least 100 feet, so that the end connector is clearly visible to the OTDR, and separate from a connection to an MPO switch, as explained below. Some preferred embodiments include strands with lengths of 120 and 200 feet, respectively. It is understood that in some embodiments, the strands are longer than 200 feet. The shape of the mandrel cross-section is preferably circular, ovular, or elliptical, but may be any other shape, so long as the shape has rounded corners. The housing is made of any material strong enough to support the mandrel and the fiber strands housed within, such as plastic, and is sized and shaped to fit around the mandrel and fibers without too much extra room within.

In some embodiments of the launch cable assembly, the housing includes more than one port. With such embodiments, more than one type of cable may be tested using the same launch cable assembly. The cable types may vary in terms of the number of optical strands contained within the cable, as well as in terms of the type of connector with which the cable is terminated. The housing may include one port that is optically connected to twelve optical strands, as discussed above, and that port is used for testing twelve fiber cables. Another port may be optically connected to twenty-four, six, or two strands, for use with multi-fiber cables with that number of optical fibers within. In addition, the housing may include a port connected to a single fiber, for use with single fiber cables. The housing may also include ports that may accept different types of connectors, such as one port that accepts MPO connectors, and one port that accepts a different type of standard connector. The housing may include ports for each of these options or any combination thereof. It is understood that for every port, additional fiber strands are wrapped around the mandrel within the housing, and an additional set of fiber strands terminating in a connector will also be included extending from the housing.

The launch cable assembly may also form part of a kit, which includes the launch cable assembly as described above and an MPO switch, such as those sold under trademarks FIBERNEXT. The MPO switch includes a port for accepting an MPO connector of a multi-fiber cable under test and is connectable to any OTDR so that the OTDR may send pulses through each of the fiber strands within the multi-fiber cable under test. A basic MPO switch includes software and a user interface that allows a user to switch between fiber strands to test. More advanced MPO switches may have additional functionality, such as controls for the OTDR, displays, functionality concerning the various settings and test results of the OTDR, etc. . . . . The MPO switch may be used with a single- or multi-mode fibers; MPO or SC connectors; and ribbon or loose fiber cables.

In some embodiments, the kit also includes an OTDR usable or integrated with the MPO switch. The OTDR may be any OTDR commonly used in the art. The OTDR and MPO switch are connected by a preferably short cable. It is preferred that the cable be short so that the OTDR does not see the connection of the assembly connector to the MPO switch or any connectors between the MPO switch and the OTDR. Some embodiments include two cable launch assemblies as described above, two MPO switches, and two OTDRs, for use on either end of the multi-fiber cable to be tested. Some embodiments include the multi-fiber cable to be tested. In such embodiments including two of each element, the two MPO switches preferably include wireless communication capabilities so that they may communicate information between one another during testing.

The launch cable assembly may be used in the following method be executed by someone performing a test on a multi-fiber cable: plugging the end connector of the multi-fiber cable under test into the port of the launch cable assembly of the present invention; plugging the assembly connector of the launch cable assembly into an MPO switch; connecting the MPO switch to an OTDR; and using the interface on the MPO switch to switch between each fiber strand until all fiber strands have been tested. In some embodiments, the method also includes the following steps: plugging the second end connector of the multi-fiber cable under test into the port of a second launch cable assembly of the present invention; plugging the assembly connector of the second launch cable assembly into a second MPO switch; and connecting the second MPO switch to a second OTDR. In such latter embodiments of the method, one side may test one half of the strands, and the other side may test the other half of the strands, so that the entire test would take half the time. Alternatively, as a redundancy measure, both sides may test all strands so that the tests on a single strand from different ends of the strand may be compared to ensure consistent, accurate test readings.

A software product that is stored on a computer readable medium and executable by a processor within an MPO switch may be used in conjunction with the launch cable assembly. The software product includes wireless communication code for allowing a pair of separate MPO switches to exchange information with each other wirelessly and switching software code for switching between fiber strands. The software product allows a pair of MPO switches to communicate with one another as to which fiber strands within a multi-fiber cable under test have been tested so that each MPO switch tests half of the strands and the test of the entire cable may be performed in half the time. In some embodiments, the software product also includes comparison software code for comparing results of tests performed on the same fiber strand from each end of the cable by each of the MPO switches.

In its most basic form, the housing of the present invention includes a substantially cylindrical exterior defining an interior space. As used in this context, "substantially cylindrical" may mean any of the following: a perfect cylinder with closed tops and bottoms; a cylinder with closed tops and bottoms where the intersection of the cylindrical side with the closed tops and bottoms is rounded; either of the previous with a box extending from a portion of the cylindrical side; any of the previous where the cylinder includes a second smaller, concentric cylinder in the middle, so that the substantially cylindrical exterior is akin to a donut shape; etc. As disclosure of the present invention progresses, one of at least ordinary skill in the art will comprehend what "substantially cylindrical" means herein with relation to the various embodiments.

The exterior of the housing of the present invention includes first and second substantially flat, round sides. In conjunction with the discussion above, as used in this context, "substantially round" may mean that the sides are perfect circles; that they are rounded at their edges; that they include a box shape coming off of their circumference; that they include a smaller, concentric circle in the middle, like a donut; etc. When concentricity of a "substantially cylindrical" or "substantially round" element is discussed, it is understood that the concentricity being discussed is with the actually round portion of that element if the element is not perfectly round. The term "substantially flat" as used herein allows for the small thickness of the material out of which the sides are made. In addition, "substantially flat" includes embodiments in which a groove extension extends slightly out of the sides, as discussed below.

The first and second sides are parallel to one another and connected by a height, which is perpendicular to the first and second sides. The height provides the cylindrical shape of the exterior and the sides are the closed top and bottom. There is a division along the perimeter of the height. The first part of the housing includes the first side and the height to the left of the division. The second part of the housing includes the second side and the height to the right of the division. The first and second parts fit together and may be secured together. In some embodiments, the first and second parts are essentially mirror images of one another because the division is through the center of the height, so that the designation of "first" and "second" is essentially arbitrary. In some embodiments, however, the division is not in the center of the height so that one part is larger in terms of depth than the other.

When the first and second parts are joined, they define the interior space within. At least two round mandrels fit snugly within the interior space. It is preferred that the mandrels be made of flexible rubber. Each mandrel has flat, round mandrel tops and bottoms connected by a mandrel height. When positioned within the interior space, the mandrel tops, bottoms, and heights are concentric with the first and second sides of the exterior. In the launch cable assembly of the present invention, as discussed in more detail below, fiber, such as a single mode fiber and a multimode fiber, are wrapped around each mandrel. The end portions of each of these fibers extend out of the exterior through cord exits in the exterior. Therefore, the housing also includes at least two cord exits through the height of the exterior. It is preferred that the housing include two or three mandrels and two or three corresponding cord exits. More mandrels and cord exits may also be included. In addition, although not preferred, the cord exits may be through another portion of the exterior other than the height. Each cord exit may be a set of two cord exits.

In preferred embodiments, a groove is included for wrapping the exterior portions of the fibers around the exterior of the housing. In one such embodiment, the grooves are along the perimeter of the exterior, preferably with one groove to the left of the division in the first part, and one groove to the right of the division in the second part. In another such embodiment, a groove extension extends out of each side of the exterior. The groove extension includes the groove adjacent to the side out of which the groove extension extends and a lip, where the groove is formed between the side and the lip.

In preferred embodiments, the exterior is not perfectly round, but includes a box extending from its height. The box includes a top, a bottom parallel to one another, and three pieces connecting the top and bottom. The first and third pieces intersect with the height and connect the second piece. It is preferred that the cord exits are through either the first piece of the box, the third piece of the box, or a cord exit through each of the first and third pieces of the box. The box may be disposed so that the bottom and top are coplanar with, extensions of, and part of the first and second sides. Alternatively, the box may be entirely within the height of the exterior and not included in either side so that each side is perfectly round or donut-shaped. Alternatively, the box top may be an extension of one side, while the box bottom is within the height of the exterior so that the other side is perfectly round or donut-shaped. The box may be divided by the division. Alternatively, the box may be included entirely in one part of the exterior. In all embodiments, the box top and bottom are parallel to, if not coplanar with, the first and second sides.

In preferred embodiments, the housing includes a hole wall concentric with the height of the exterior and extending between the first and second sides. One or both sides may include a hole whose edges intersect with the hole wall. In embodiments where both sides include a hole, one hole in the side may be covered by a hole cover. In embodiments where only one side includes a hole, the side that does not include a hole is flush across the hole wall. Some embodiments include a hole lid, which includes a lid piece that is sized and dimensioned to cover the hole; a hinge affixed to the lid piece and the side in which the hole is disposed, and allows the lid piece to move to an open position at an angle relative to the side in which the hole is disposed or to a closed position in which the lid piece covers the hole; and a latch that operates to removably secure the lid piece in the closed position. In embodiments in which both sides include a hole, a strap may be included. The strap loops through the holes and the hole wall to attach to itself and ends in a hook. A container insert may also be affixed within the hole wall between the first and second sides.

The launch cable assembly of the present invention may be used in conjunction with any of the embodiments of the housing as discussed above. The launch cable assembly includes at least a single mode fiber wrapped around one mandrel and a multimode fiber wrapped around another mandrel. The portion of each fiber wrapped around the mandrel is the interior length of the fiber. The fiber extends through the cord exits so that a portion of each end of the fiber is outside of the exterior of the housing. The portions of each end of each fiber that so extend outside of the exterior are the exterior lengths of the fibers. Each exterior length ends in a fiber end with a connector. The connector may be any now or future commonly used in the art.

These aspects of the present invention are not meant to be exclusive and other features, aspects, and advantages of the present invention will be readily apparent to those of ordinary skill in the art when read in conjunction with the following description and accompanying drawings.

DETAILED DESCRIPTION

Figure 1:
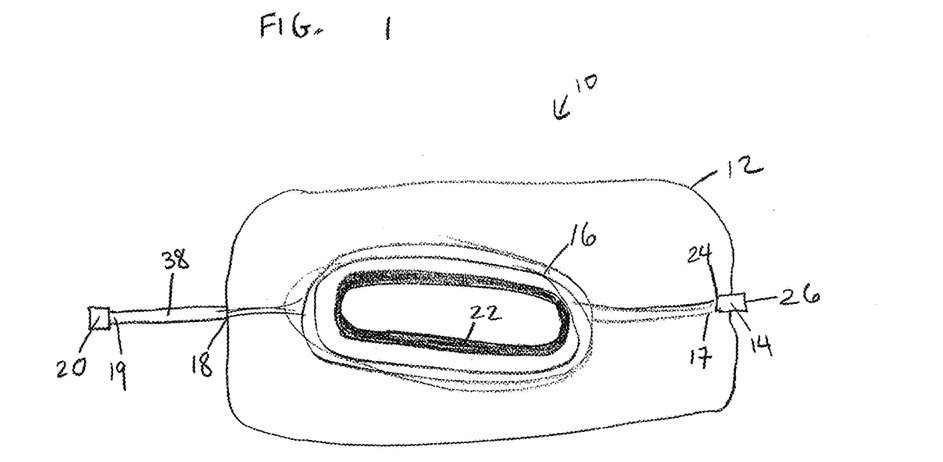
FIG. 1 is a cross-section view of a launch cable assembly.
Figure 2B:
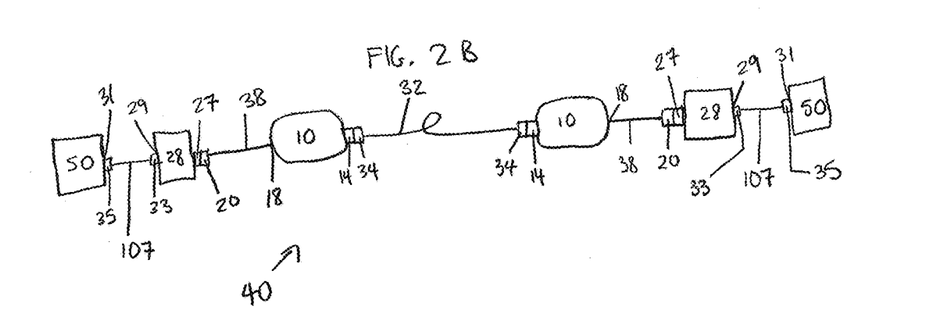
FIG. 2B is a diagram of the kit.

Referring first to FIG. 1, a cross-sectional view of launch cable assembly 10 of the present invention is provided. Launch cable assembly 10 includes housing 12 with cable port 14 and fiber exit 18. Housing 12 is shown as being ovular in shape, but it is understood that the shape and size of the housing 12 will be similar to, but slightly larger than, the shape and size of mandrel 22. Cable port 14 has outer side 26 on the outside of housing 12 that accepts first MPO connector 34 of a multi-fiber cable 32 under test, as shown in FIG. 2B. Cable port 14 has inner side 24 on the inside of housing 12 that is in optical communication with fiber strands 16. Fiber strands 16 are between twenty-five and two hundred feet long and are wrapped around mandrel 22. Fiber strands 16 have first ends 17 where they are in optical communication with inner side 24 of port 14, and second ends 19 where they gather into second connector 20. Mandrel 22 is shown as elliptical, but it is understood that mandrel 22 may also be circular, ovular, or any shape that has rounded edges. Fiber strands 16 exit the housing 12 through fiber exit 18. From there, fiber strands 16 are wrapped in a tube 38 to protect the strands 16 and to provide a less unwieldy assembly 10. It is understood that in some embodiments, tube 38 is omitted. Fiber strands 16 wrapped in tube 38 terminate in second connector 20.

The number of fiber strands 16 is equal to the number of optical fibers within the multi-fiber cable 32 under test. The strands 16 are connected to the inner side 24 of port 14 such that light traveling through the optical fiber strands of the cable 32 will also travel through strands 16 of the launch cable assembly 10, and vice versa. Preferred embodiments include twelve or twenty-four fiber strands 16 for use with twelve or twenty-four fiber cables 32 under test.

Now referring to FIGS. 2A and 2B, diagrams for systems for using OTDR 50 to test multi-fiber cable 32 are provided. FIG. 2A is a prior art system as described above. The system is shown with breakout assemblies 100 and OTDRs 50 on either side of cable 32 to be tested. FIG. 2B is a kit 40 of the present invention, including launch cable assembly 10, MPO switch 28, and OTDR 50 on either side of cable 32 to be tested. First MPO connector 34 of cable 32 mates with cable port 14 on housing 12 of launch cable assembly 10. This puts the fibers within cable 32 in optical communication with fiber strands 16, as shown in FIG. 1. After one hundred feet of fiber strands 16 are wrapped around mandrel 22, as shown in FIG. 1, fiber strands 16 exit housing 12 through fiber exit 18 and are encapsulated in tube 38 until they terminate in second connector 20, which is preferably also a standard MPO connector. Second connector 20 plugs into MPO switch 28 at switch port 27, which is, in turn, connected to OTDR 50 through MPO-OTDR cable 107. MPO-OTDR cable 107 has MPO switch connector 33 that plugs into MPO switch input 29 on MPO switch 29, and OTDR connector 35 that plugs into OTDR input 31 on OTDR 50. This is a preferred method of connecting MPO switch 28 and OTDR 50, but it is understood that this connection may be by any means commonly used in the art. OTDR 50 generates pulses that are launched into MPO-OTDR cable 107, through MPO switch 28, into one of the fiber strands 16, and then into the individual fibers of multi-fiber cable 32. MPO switch 28 switches which fiber strand 16 has the pulse from OTDR 50 launched into it, so that all fiber strands 16 have a pulse launched into them. Thus, all fiber strands within multi-fiber cable 32 are, in turn, tested.

The embodiment shown in FIG. 2B shows launch cable assemblies 10, MPO switches 28, and OTDRs 50 on either end of multi-fiber cable 32. This allows half of the fibers to be tested from one end, and the other half from the other end, so that a test of all fibers is completed in half the time. Alternatively, all fibers may be tested from both sides to ensure consistent test results across all fibers.

Figure 3:
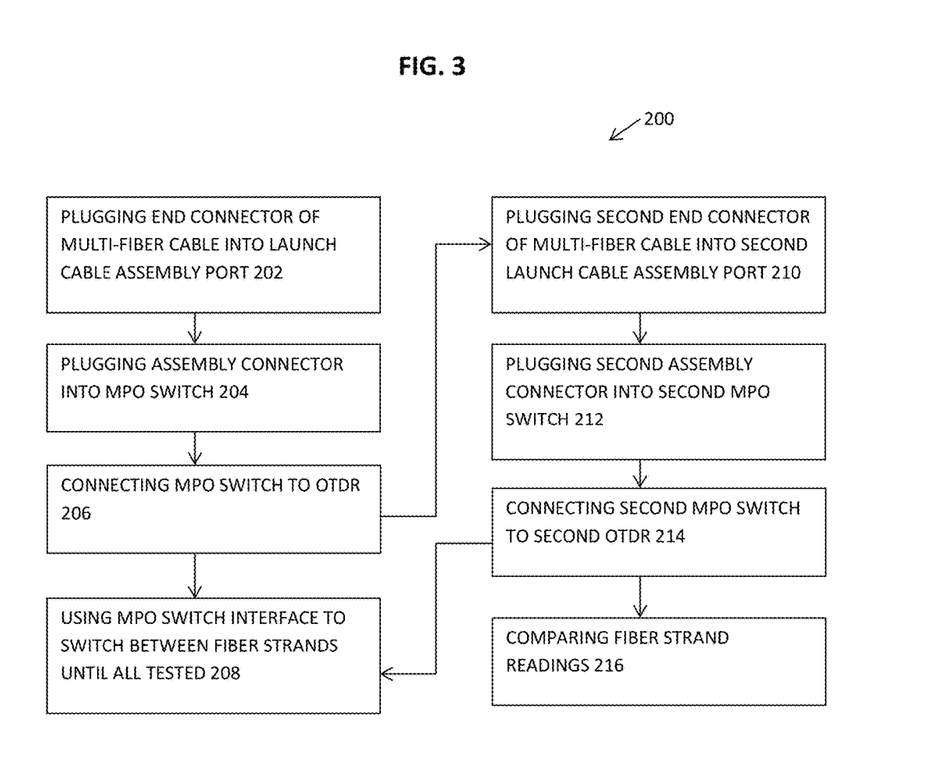
FIG. 3 is a flowchart of the method.

Now referring to FIG. 3, the steps of method 200 are shown in a flow chart. On the left, the steps of method 200 in its most basic form are shown: plugging the end connector of the multi-fiber cable under test into the port of the launch cable assembly of the present invention 202; plugging the assembly connector of the launch cable assembly into an MPO switch 204; connecting the MPO switch to an OTDR 206; and using the interface on the MPO switch to switch between each fiber strand until all fiber strands have been tested 208. On the right, the steps of an expanded method 200 are shown. This method may be used with the kit 40 shown in FIG. 2B, with launch cable assemblies 10, MPO switches 28, and OTDRs 30 on either end of multi-fiber cable 32. The addition steps are: plugging the second end connector of the multi-fiber cable under test into the port of a second launch cable assembly of the present invention 210; plugging the assembly connector of the second launch cable assembly into a second MPO switch 212; and connecting the second MPO switch to a second OTDR 214. On either the right or the left, the final step is switching between fibers until all are tested 208. On the right, there may be the additional step of comparing test results of the same fiber taken at different ends 216.

Figure 4:
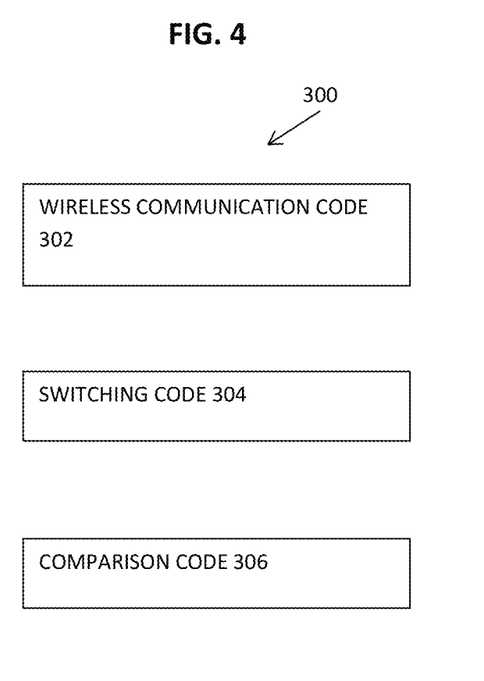
FIG. 4 is a block diagram of the functionality of the software product.

Now referring to FIG. 4, a block diagram of the functionality of the software product 300 of the present invention is provided. The software product 300 includes wireless communication code 302 for allowing a pair of separate MPO switches to exchange information with each other wirelessly and switching software code 304 for switching between fiber strands. The software product 300 allows a pair of MPO switches to communicate with one another as to which fiber strands within a multi-fiber cable under test have been tested so that each MPO switch tests half of the strands and the test of the entire cable may be performed in half the time. In some embodiments, the software product 300 also includes comparison software code 306 for comparing results of tests performed on the same fiber strand from each end of the cable by each of the MPO switches.

Figure 5A:
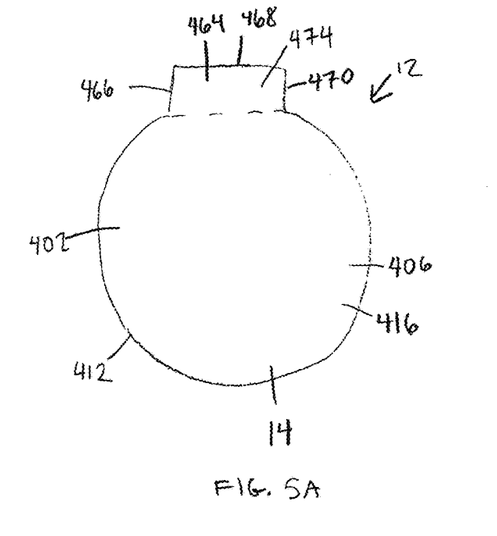
FIG. 5A is a top down view of a housing of the present invention.
Figure 5B:
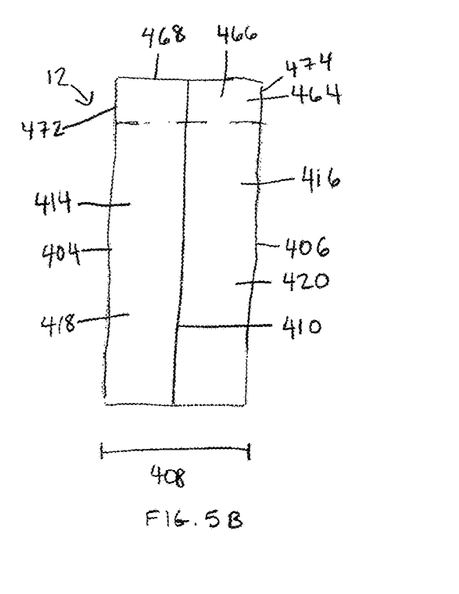
FIG. 5B is a side view of the housing.
Figure 5C:
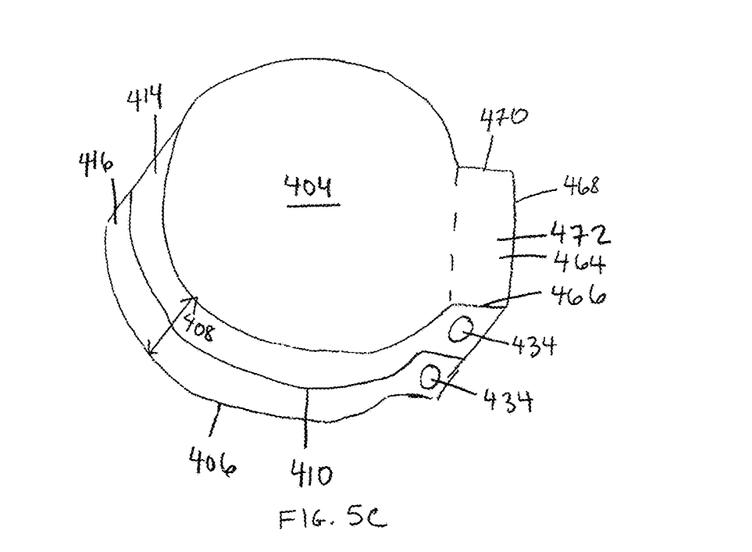
FIG. 5C is a perspective view of the housing.
Figure 9A:
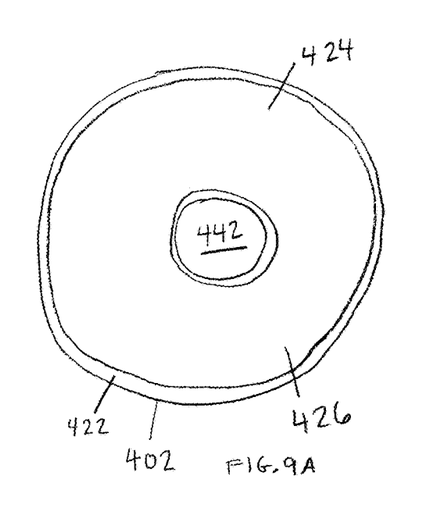
FIG. 9A is a top down cutaway view of a housing of the present invention.
Figure 9B:
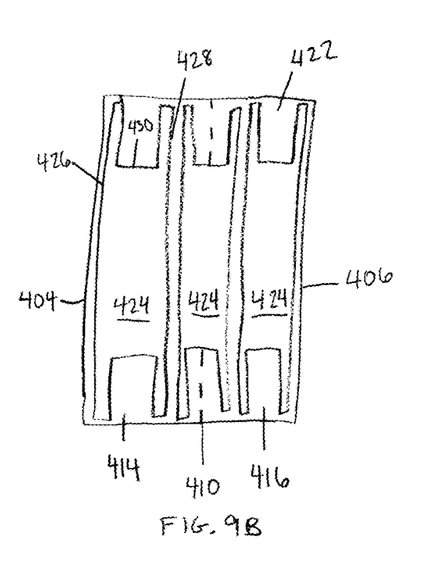
FIG. 9B is a side cutaway view of the housing of the present invention.
Figure 11:
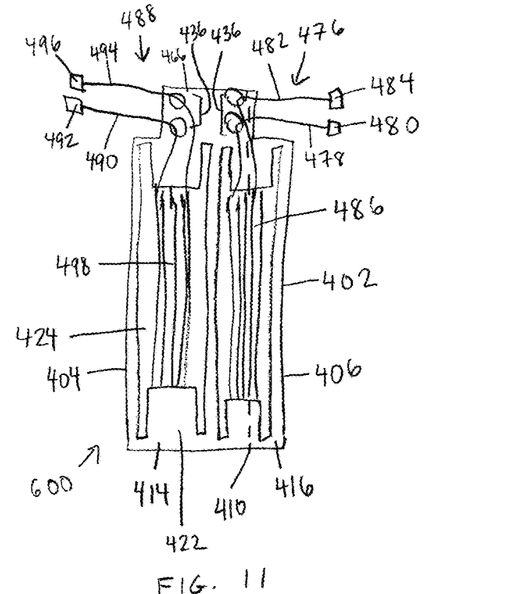
FIG. 11 is a side cutaway view of a launch cable assembly of the present invention.

Now referring to FIGS. 5A-5C, various views of a housing 12 of the present invention are provided. Exterior 402 of housing 12 is shown. Exterior 402 defines an interior space 422 within the exterior 402 of housing 12, as shown in FIGS. 9A, 9B, and 11, for example. Exterior 402 includes at least first side 404, second side 406, and height 408 therebetween.

Exterior 402 also includes first and second parts 414, 416. First and second parts 414, 416 are removably affixable to one another. That is to say, as with prior art housing or cases for launch cable assemblies, two parts fit together around the interior contents of the casing and are held thereto. As is standard, first part 414 typically includes a lip and second part 416 typically includes an indentation into which the lip of the first part 414 fits so that the first and second parts 414, 416 are guided into joining. First and second parts 414, 416 are typically held together or removably affixable to one another by screws.

When joined, first and second parts 414, 416 are divided along division 410. Division 410 extends around the perimeter 412 of the exterior 402. Although the shape of the exterior is always "substantially cylindrical" and sides 404, 406 are always "substantially round," as defined above, perimeter 412 may not be perfectly round in some embodiments, like that shown in FIG. 5A, where perimeter 412 also goes around the shape of box 464. As shown most clearly in FIG. 5B, first part 414 includes first side 404 and the portion 418 of height 408 to the left of division 410. Second part 416 includes second side 406 and the portion 420 of height 408 to the right of division 410. It is understood that in many embodiments, such as that shown in FIGS. 5A-5C, first and second parts 414, 416 are essentially mirror images of one another, and as such the designations of "left" or "right" of division 410 are arbitrary. In some embodiments, however, such as that shown in FIGS. 7B and 11, first and second parts 414, 416 are different sizes. In addition, it is understood that first and second sides 404, 406 are only a part of first and second parts 414, 416.

In the embodiment shown, exterior 402 also includes box 464 integrated into first and second parts 414, 416. Box 434 includes first, second, and third pieces 466, 468, 470, box top 472, and box bottom 474. First, second, and third pieces 466, 468, 470 are part of height 408 and are divided by division 410. That is to say, that portions of each of first, second, and third pieces 466, 468, 470 are included in each of first and second parts 414, 416. As shown most clearly in FIG. 5C, box top 472 is essentially an extension of first side 404, and is therefore included in its entirety in first part 414. Box bottom 474, is essentially an extension of second side 406, and is therefore included in its entirety in second part 416. In other words, box top 472 and first side 404 are coplanar, and box bottom 474 and second side 406 are coplanar. The dashed lines shown in FIGS. 5A-5C indicate where the edge of first and second sides 404, 406 intersect with first and third pieces 466, 470 of box 464. The dashed line is merely illustrative and in one of the preferred embodiments of housing 12, there is no such physical structure corresponding to the dashed line. Rather, in this preferred embodiment, box top 472 is flush with first side 404 and box bottom 474 is flush with second side 406. As shown in FIG. 7B, however, in some embodiments, elements of box 464 may not intersect with and/or be coplanar and flush with first and/or second sides 402, 404. This embodiment is explained in more detail below with reference to FIG. 7B.

Cord exits 434 are shown in FIG. 5C. Housing 12 includes at least one cord exit 434 for each fiber wrapped around a mandrel 424, as discussed with reference to FIGS. 9A, 9B, and 11. Housing 12 is designed to house at least two mandrels 424, so housing 12 will always include at least two cord exits 434. Each fiber has two ends extending out of cord exit 434. As such, each cord exit 434 may be a set of two cord exits 434 so that each end of each fiber is threaded through a different cord exit 434. In the embodiment shown in FIG. 5C, both ends of a fiber will be threaded through the same cord exit 434. By way of example and using reference numbers as discussed below with reference to FIG. 11, housing 12 shown in FIG. 5C houses two mandrels 424. The first mandrel 424 has a single mode fiber 476 wrapped around it and that single mode fiber 476 has two ends 480, 484, both of which extend out of one of the cord exits 434. The second mandrel 424 has a multimode fiber 488 wrapped around it and that multimode fiber 488 has two ends 492, 496, both of which extend out of the other of the cord exits 434. Alternatively, as shown in FIG. 11, each cord exit 434 is a set of two cord exits 434, so that first and second ends 484, 484 of single mode fiber 476 each extend out of their own separate cord exit 434, and first and second ends 492, 496 of multimode fiber 488 each extend out of their own separate cord exit 434. In embodiment shown in FIG. 5C, one cord exit 434 extends through each of the first and second parts 414, 416, specifically through first piece 466 of box 464. In other embodiments, such as the one shown in FIG. 7B, one cord exit 434 may be through first piece 466 and the other cord exit may be through third piece 470. In addition, in FIG. 5C, where first and second parts 414, 416 are essentially mirror images of one another so that division 410 essentially bisects exterior 402, one cord exit 434 is included in first part 414 and the other cord exit 434 is included in second part 416. As shown in the embodiments illustrated in FIGS. 7B and 11, however, it is understood that especially in embodiments where one of first part 414 or 416 is significantly smaller than the other, both cord exits 434 may be included in a single part 414 or 416.

It is understood that although box 464 is a preferred inclusion in exterior 402, it is not a necessary one. One of at least ordinary skill in the art will recognize that exterior 402 may be perfectly round without box 464, and that cord exits 434 may be through any portion of height 408 or first and second sides 404, 406. It is not preferred to have cord exits 434 through first and second sides 404, 406, however, as it may require excessive bending of the fibers or cords.

Figure 6A:
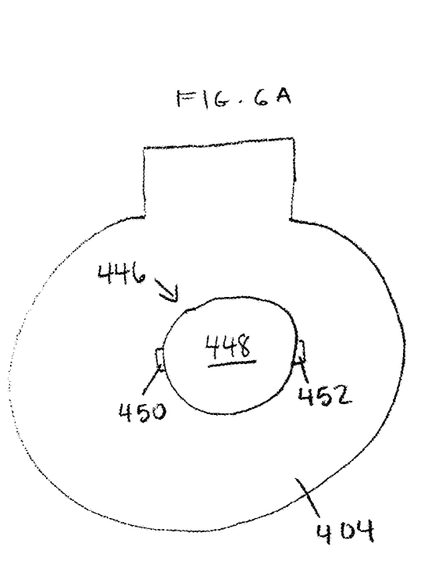
FIGS. 6A-6C are top down views of various embodiments of the housing of the present invention with a hole in the middle.
Figure 6B:
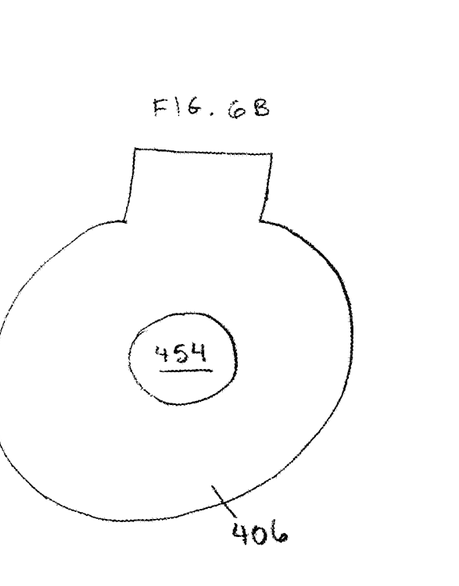
Figure 6C:
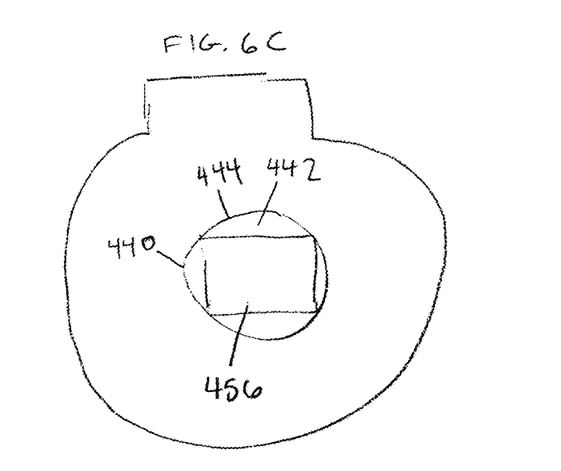

Now referring to FIGS. 6A-6C, embodiments in which housing 12 includes a hole wall 440 are provided. Hole wall 440 is accompanied by holes 442 in one or both of first and second sides 404, 406. The edges 444 of hole(s) 442 intersect with hole wall 440 at first and/or second sides 404, 406. In some embodiments, such as that shown in FIG. 8, hole 442 extends through first and second sides 404, 406 and is open on both sides 404, 406. In some embodiments, such as that shown in FIG. 6B, the mold for the exterior 402 has both sides 404, 406 open, but a hole cover 454 is integrated into the exterior 402 so that practically, it is though hole 442 does not extend through second side 406. Hole cover 454 may be affixed in place over hole 442 in second side 406 by any means commonly used in the art. It is preferred, however, that the mold for exterior 402 make second side 406 a continuous piece so that hole 442 does not extend through second side 406 and hole cover 454 may be eliminated. In such embodiments, and embodiments including hole cover 454, it is preferred that the exterior 402 also include hole lid 446. Hole lid 446 is incorporated into first side 404 to removably cover hole 442 in the first side 404. Hole lid 446 includes lid piece 448, which is the actually covering piece; hinge 450, which is attached to both first side 404 and lid piece 448, and allows lid piece 448 to move relative to first side 404 between an open position at an angle with first side 404 and a closed position essentially flush with first side 404; and latch 452 to secure lid piece 448 in the closed position. These features provide a storage space within hole wall 440.

Alternatively, a container insert 456 may be affixed within hole wall 440 to provide storage, as shown in FIG. 6C. Container insert 456 may be used in embodiments where hole 442 extends through both sides 404, 406, but in such embodiments that include container insert 456, it is preferable that second side 406 not include hole 442 or that second side 406 include hole cover 454, as shown in FIG. 6B. Container insert 456 may be affixed within hole wall 440 by any means commonly used in the art, such as adhesion or clips. Although container insert 456 is shown as being rectangular, such as a fishing tackle box, it is understood that container insert 456 may be round to fit more exactly within hole wall 440, or any other shape or size that will fit within that space.

Figure 7A:
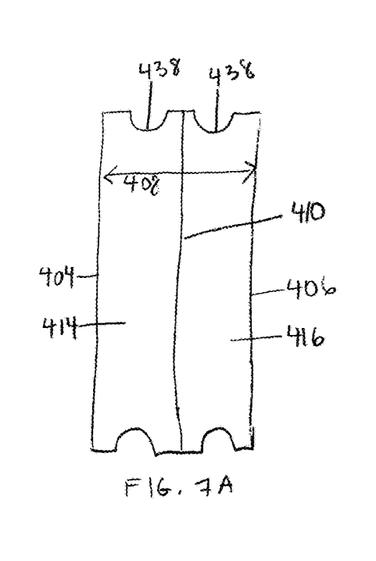
FIGS. 7A-7B are side views of various embodiments of the housing of the present invention with grooves.
Figure 7B:
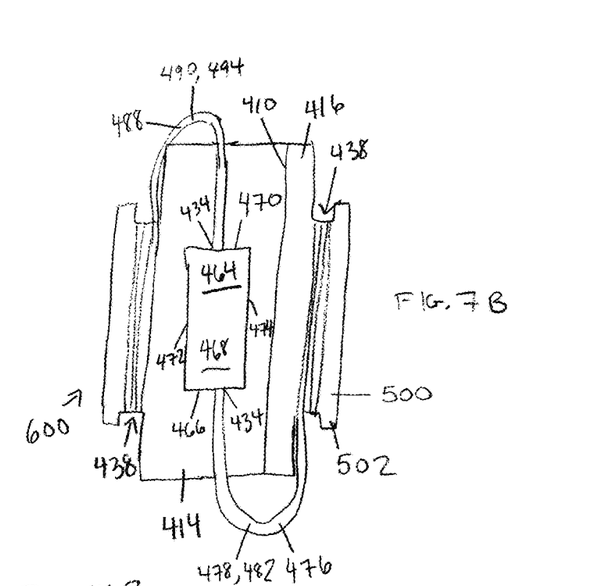

Now referring to FIGS. 7A and 7B, embodiments of housing 12 that include groove 438 are provided. Groove 438 provides a place outside of the interior space 422 where fibers 476, 488 may be wrapped. Although most of the lengths of fibers 476, 488 will be wrapped around mandrels 424, as discussed below with reference to FIGS. 9B and 11, each of the ends 480, 484, 492, 496 of the fibers 476, 488, as well as some exterior lengths 478, 482, 490, 494 will extend through cord exits 434 out of interior space 422. Grooves 438 allow for these exterior lengths 478, 482, 490, 494 to be wrapped around the exterior 402 of housing 12. As shown in FIG. 7A, two grooves 438, one for each of the fibers 476, 488, extend around height 408 of exterior 402 on either side of division 410. This embodiment is most applicable to those embodiments of housing 12 in which first and second parts 414, 416 are essentially mirror images of one another. Alternatively, as shown in FIG. 7B, the two grooves 438 are not incorporated into height 408, but are included in groove extensions 500. Groove extensions 500 extend out from each of first and second sides 404, 406. Each groove extension 500 includes a lip 502 and the groove 438 itself. As shown, the grooves 438 are adjacent to each side 404, 406 and are formed between the side 404, 406 and the lip 502. FIG. 7B illustrates box 464 completely incorporated into first part 414, left of division 410. In addition, neither box top 472 nor box bottom 474 is flush with or an extension of first or second side 404, 406.

FIG. 7B illustrates an embodiment of launch cable assembly 600 of the present invention, which includes single and multimode fibers 476, 488 wrapped around mandrels 424 within the interior space 422 (shown in FIG. 11, for example). Both of the exterior lengths 478, 482 of single mode fiber 476 are shown extending out of the same cord exit 434. Both of the exterior lengths 490, 494 of multimode fiber 488 are shown extending out of the other cord exit 434. This illustrates a benefit of the present invention. In prior art, only one mandrel is included, and typically one exterior length of the fiber comes out of one cord exit on one side of the housing and the other exterior length of the fiber comes out of another cord exit on the other side of the housing. The technician then has to wrap each end individually. Through experimentation, the present inventor, has discovered that the fibers may be positioned to both exit the same cord exit 434 without unduly bending the fiber so as to sacrifice performance. As such, a technician using the present invention may wind, for example, both exterior lengths 478, 482 of single mode fiber 476, at the same time around the groove 438 shown on the right.

Figure 8:
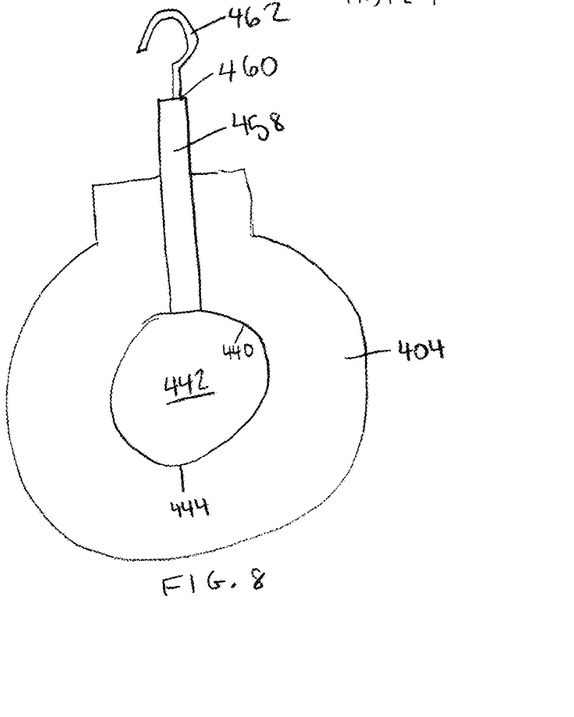
FIG. 8 is a top down view of a housing of the present invention with a strap.

Now referring to FIG. 8, an embodiment of housing 12 including strap 458 is illustrated. In such embodiments that include strap 458, each of first and second sides 404, 406 include a hole 442. Strap 458 extends through holes 442 and hole wall 440 therebetween, and attaches to itself. This attachment may be by any means commonly used in the art, such as a snaps, adhesion, stitching, a buckle, etc. Strap 458 includes an end 460, which is the other end of strap 458 that is not attached to itself. The end 460 of strap 458 includes a hook 462 so that the entire housing 12 may be hung up. This is handy for storage and organization.

Now referring to FIGS. 9A and 9B, cutaway views of housing 12 are provided to illustrate mandrels 424. Mandrels include round, flat tops 426 and bottoms 428 with a mandrel height 430 between the tops and bottoms 426, 428. Mandrels 424 are round and, when positioned within interior space 422 as intended, are concentric with sides 404, 406 and only snugly fit within the interior space 422. As used in this context, "snugly" means that the diameter of mandrel tops 426 and bottoms 428 are only slightly smaller than the diameter of sides 404, 406 so that although mandrels 424 fit within the interior space 422, there is little additional "wiggle room" so that mandrels 424 are held substantially in place within interior space 422. FIG. 9B is a side cutaway view of an embodiment of housing 12 that includes three mandrels 424 around which three types of fiber may be wrapped. Division 410 is shown in dotted lines. It is preferred that mandrels 424 be made of flexible rubber. Such a flexible rubber is sturdy enough to support the fiber wrappings, but is extremely light and durable.

Figure 10A:
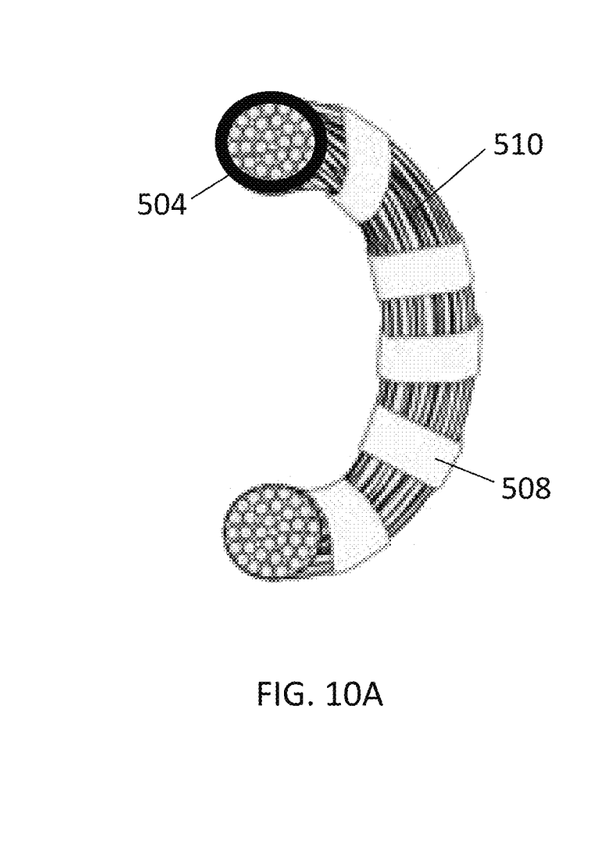
FIG. 10A is a cutaway perspective view of a prior art fiber winding using spiral wrap.
Figure 10B:
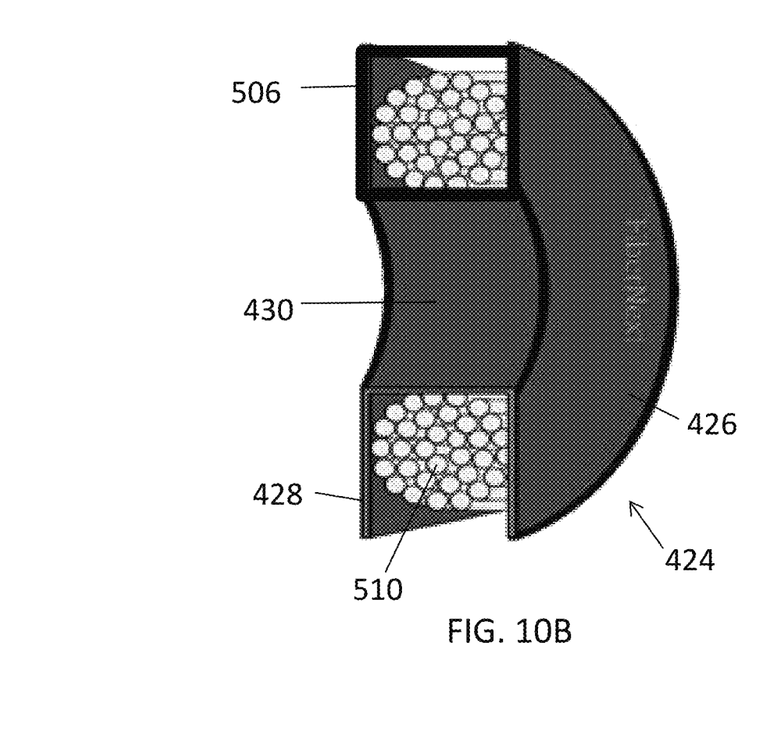
FIG. 10B is a cutaway perspective view of a present invention fiber winding using a mandrel.

Now referring to FIGS. 10A and 10B, an advantage of the present invention over the prior art is illustrated. As shown in FIG. 10A, in the prior art, it is typical to bind fiber windings 510 into a circular winding with tape or spiral wrap 508. This results in a circular cross section 504 (emboldened) of the windings 510. As shown in FIG. 10B, using mandrels 424 such as in the present launch cable assembly 600, discussed in more detail with reference to FIG. 11, such tape or spiral wrap 508 is not necessary, as the mandrel 424 provides definition for the shape of the windings 510, and the mandrel top 426, bottom 428, and height 430 support and hold this shape. In addition, the rectangular cross section 506 (emboldened) of mandrel 424 provides more space for the windings 510, so that a longer fiber may be wrapped in the same amount of space.

Now referring to FIG. 11, a side cutaway of the launch cable assembly of the present invention is provided. In the embodiment shown, housing 12 includes two mandrels 424 snugly fit within the interior space 422 defined by the exterior 402. A single mode fiber 476 is wrapped around the mandrel 424 on the right. A multimode fiber 488 is wrapped around the mandrel 424 on the left. Division 410, shown in a dotted line, is significantly to the right of center, so that first part 414 of exterior 402 is significantly larger than second part 416. Both cord exits 434 are included in first part 414. In addition, both cord exits 434 are included in first piece 466 of box 464. Cord exits 434 are each a set of two cord exits to accommodate cord exits for each end 480, 484, 492, 496 of each fiber 476, 488. It is understood that one cord exit 434 could also be through each of the first and third pieces 466, 470 of box 464, as shown in FIG. 7B or that cord exits 434 could be through another portion of height 408 or either side 404, 406. Single mode fiber 476 includes interior length 486, which is wrapped around mandrel 424, and first and second exterior lengths 478, 482 extending out of cord exits 434 and ending in first and second ends 480, 484, which end in connectors. As discussed above, these connectors may be any of a variety commonly used in the art or future embodiments of common connectors. Multimode fiber 488 includes interior length 498, which is wrapped around mandrel 424, and first and second exterior lengths 490, 494 extending out of cord exits 434 and ending in first and second ends 492, 496, which end in connectors. A technician working with such a launch cable assembly 600 does not need to remember and bring separate launch cable assemblies to accommodate single and multimode fibers under test.

Although the present invention has been described in considerable detail with reference to certain preferred versions thereof, other versions would be readily apparent to those of ordinary skill in the art. Therefore, the spirit and scope of the description should not be limited to the description of the preferred versions contained herein.

I claim:

1. A housing for a launch cable assembly comprising:
a substantially cylindrical exterior comprising:
  a first substantially flat round side;
  a second substantially flat round side parallel to said first side;
  a height between said first and second sides;
  a division along a perimeter within said height;
  a first part comprising said first side and a portion of said height left of said division; and
  a second part comprising said second side and a portion of said height right of said division, wherein said first part and said second part are removably affixable to one another;
  wherein each of said portion of said height left of said division of said first part and said portion of said height right of said division of said second part comprises a groove around said perimeter of said height;
an interior space defined by said exterior;
at least two round mandrels disposed within said interior space, wherein each of said at least two mandrels:
  physically touches at least one other of said at least two mandrels;
  is concentric with said first and second sides; and
  comprises:
    a substantially flat round mandrel top and a substantially flat round mandrel bottom, wherein each of said mandrel top and said mandrel bottom is sized so as to snugly fit within said interior space; and
    a cylindrical mandrel height that connects said mandrel top and said mandrel bottom such that said mandrel height, said mandrel top, and said mandrel bottom are concentric;
at least two cord exits disposed through said height of said exterior.

2. A housing for a launch cable assembly comprising:
a substantially cylindrical exterior comprising:
  a first substantially flat round side;
  a second substantially flat round side parallel to said first side;
  a height between said first and second sides;
  a division along a perimeter within said height;
  a first part comprising said first side and a portion of said height left of said division;
  a second part comprising said second side and a portion of said height right of said division, wherein said first part and said second part are removably affixable to one another;
a box extending from said height of said exterior, said box comprising:
  a box top and a box bottom each of which is parallel to said first and second sides;
  first, second, and third pieces extending between said box top and said box bottom, wherein said first and third pieces intersect with said height and said second piece extends between said first and third pieces; and
  two cord exits extending through one of a group consisting of said first side of said box; said third side of said box; and said first and third sides of said box; and
a cylindrical hole wall concentric with said height, extending between said first and second sides;
an interior space defined by said exterior;
at least two round mandrels made of flexible rubber, disposed within said interior space, wherein each of said at least two mandrels:
  are concentric with said first and second sides; and
  comprise:
    a substantially flat round mandrel top and a substantially flat round mandrel bottom, wherein each of said mandrel top and said mandrel bottom is sized so as to snugly fit within said interior space; and
    a cylindrical mandrel height that connects said mandrel top and said mandrel bottom such that said mandrel height, said mandrel top, and said mandrel bottom are concentric.

3. The housing as claimed in claim 2, wherein said second part of said exterior extends across said hole wall and said first part of said exterior comprises a hole in said first side, wherein edges of said hole intersect with said hole wall; and
further comprising a hole lid comprising:
  a lid piece sized and dimensioned to cover said hole in said first side of said exterior;
  a hinge affixed to and between each of said first side and said lid piece, operable to move said lid piece between an open position wherein said lid piece is at an angle relative to said first side to a closed position wherein said lid piece is flush with said first side; and
  a latch operable to removably secure said lid piece in said closed position.

4. The housing as claimed in claim 2, wherein each of said first part and said second part of said exterior comprises a hole in said first and second sides, respectively, wherein edges of said holes intersect with said hole wall; and
further comprising a strap disposed through said holes and said hole wall and attached to itself, wherein said strap comprises an end with a hook.

5. The housing as claimed in claim 2, wherein each of said portion of said height left of said division of said first part and said portion of said height right of said division of said second part comprises a groove around said perimeter of said height.

6. The housing as claimed in claim 2, further comprising at least one groove extension extending out from one of a group consisting of said first side, said second side, and said first and second sides, wherein said at least one groove extension comprises a lip and a groove adjacent to said one of said group, wherein said groove is formed between said lip and said one of said group.

7. A launch cable assembly comprising:
a housing, comprising:
  a substantially cylindrical exterior comprising:
    a first substantially flat round side;
    a second substantially flat round side parallel to said first side;
    a height between said first and second sides;
    a division along a perimeter within said height;
    a first part comprising said first side and a portion of said height left of said division;
    a second part comprising said second side and a portion of said height right of said division, wherein said first part and said second part are removably affixable to one another;
    wherein each of said portion of said height left of said division of said first part and said portion of said height right of said division of said second part comprises a groove around said perimeter of said height;
  a box extending from said height of said exterior, said box comprising:

a box top and a box bottom each of which is parallel to said first and second sides;

first, second, and third pieces extending between said box top and said box bottom, wherein said first and third pieces intersect with said height and said second piece extends between said first and third pieces; and two cord exits extending through one of a group consisting of said first side of said box; said third side of said box; and said first and third sides of said box; and a cylindrical hole wall concentric with said height, extending between said first and second sides;

an interior space defined by said exterior;

two round mandrels made of flexible rubber, disposed within said interior space, wherein each of said two mandrels:

are concentric with said first and second sides; and comprise:

a substantially flat round mandrel top and a substantially flat round mandrel bottom, wherein each of said mandrel top and said mandrel bottom is sized so as to snugly fit within said interior space; and a cylindrical mandrel height that connects said mandrel top and said mandrel bottom such that said mandrel height, said mandrel top, and said mandrel bottom are concentric;

a single mode fiber comprising:

a first exterior length extending out of one of said two cord exits of said first set of two cord exits, and comprising a first end ending in a connector;

a second exterior length extending out of the other of said two cord exits of said first set of two cord exits, and comprising a second end ending in a connector; and an interior length extending between said first and second exterior lengths within said interior space of said housing, and wrapped around said cylindrical mandrel height of one of said two mandrels; and a multi mode fiber comprising:

a first exterior length extending out of one of said two cord exits of said second set of two cord exits, and comprising a first end ending in a connector;

a second exterior length extending out of the other of said two cord exits of said second set of two cord exits, and comprising a second end ending in a connector; and an interior length extending between said first and second exterior lengths within said interior space of said housing, and wrapped around said cylindrical mandrel height of the other of said two mandrels.

8. The launch cable assembly as claimed in claim 7, wherein:

said second part of said exterior of said housing extends across said hole wall and said first part of said exterior comprises a hole in said first side, wherein edges of said hole intersect with said hole wall; and said housing further comprises a hole lid comprising:

a lid piece sized and dimensioned to cover said hole in said first side of said exterior;

a hinge affixed to and between each of said first side and said lid piece, operable to move said lid piece between an open position wherein said lid piece is at an angle relative to said first side to a closed position wherein said lid piece is flush with said first side; and a latch operable to removably secure said lid piece in said closed position.

9. The launch cable assembly as claimed in claim 7, wherein:

each of said first part and said second part of said exterior of said housing comprises a hole in said first and second sides, respectively, wherein edges of said holes intersect with said hole wall; and said housing further comprises a strap disposed through said holes and said hole wall and attached to itself, wherein said strap comprises an end with a hook.

10. A housing for a launch cable assembly comprising:

a substantially cylindrical exterior comprising:

a first substantially flat round side;

a second substantially flat round side parallel to said first side;

a height between said first and second sides;

a division along a perimeter within said height;

a first part comprising said first side and a portion of said height left of said division; and a second part comprising said second side and a portion of said height right of said division, wherein said first part and said second part are removably affixable to one another;

an interior space defined by said exterior;

at least two round mandrels disposed within said interior space, wherein each of said at least two mandrels:

physically touches at least one other of said at least two mandrels;

is concentric with said first and second sides; and comprises:

a substantially flat round mandrel top and a substantially flat round mandrel bottom, wherein each of said mandrel top and said mandrel bottom is sized so as to snugly fit within said interior space; and a cylindrical mandrel height that connects said mandrel top and said mandrel bottom such that said mandrel height, said mandrel top, and said mandrel bottom are concentric;

at least two cord exits disposed through said height of said exterior; and at least one groove extension extending out from one of a group consisting of said first side, said second side, and said first and second sides, wherein said at least one groove extension comprises a lip and a groove adjacent to said one of said group, wherein said groove is formed between said lip and said one of said group.

11. The housing as claimed in claim 10, further comprising a box extending from said height of said exterior, wherein:

said box comprises:

a box top and a box bottom each of which is parallel to said first and second sides; and first, second, and third pieces extending between said box top and said box bottom, wherein said first and third pieces intersect with said height and said second piece extends between said first and third pieces; and said at least two cord exits comprises:

a first cord exit disposed through said first piece of said box; and a second cord exit disposed through said third piece of said box.

12. The housing as claimed in claim 10, further comprising a box extending from said height of said exterior, wherein:

said box comprises:

a box top coplanar with and comprised by said first side;
a box bottom coplanar with and comprised by said second side; and
first, second, and third pieces extending between said box top and said box bottom,
wherein said first and third pieces intersect with said height and said second piece extends between said first and third pieces;
said division extends around said first, second, and third pieces; and
said at least two cord exits comprise:
a first cord exit disposed through one of said first piece and said third piece of said box; and
a second cord exit disposed through one of said first piece and said third piece of said box.

13. The housing as claimed in claim 10, further comprising a box extending from said portion of said height left of said division of said first part of said exterior, wherein:
said box comprises:
a box top and a box bottom each of which is parallel to said first and second sides; and
first, second, and third pieces extending between said box top and said box bottom,
wherein said first and third pieces intersect with said height and said second piece extends between said first and third pieces; and
said at least two cord exits comprise:
a first cord exit disposed through one of said first piece and said third piece of said box; and
a second cord exit disposed through one of said first piece and said third piece of said box.

14. A housing for a launch cable assembly comprising:
a substantially cylindrical exterior comprising:
a first substantially flat round side;
a second substantially flat round side parallel to said first side;
a height between said first and second sides;
a division along a perimeter within said height;
a first part comprising said first side and a portion of said height left of said division;
a second part comprising said second side and a portion of said height right of said division, wherein said first part and said second part are removably affixable to one another; and
a cylindrical hole wall concentric with said height of said exterior extending between said first and second sides of said exterior, wherein said second part of said exterior extends across said hole wall and said first part of said exterior comprises a hole in said first side, wherein edges of said hole intersect with said hole wall;
a hole lid comprising:
a lid piece sized and dimensioned to cover said hole in said first side of said exterior;
a hinge affixed to and between each of said first side and said lid piece, operable to move said lid piece between an open position wherein said lid piece is at an angle relative to said first side to a closed position wherein said lid piece is flush with said first side; and
a latch operable to removably secure said lid piece in said closed position;
an interior space defined by said exterior;
at least two round mandrels disposed within said interior space, wherein each of said at least two mandrels:
physically touches at least one other of said at least two mandrels;
is concentric with said first and second sides; and
comprises:
a substantially flat round mandrel top and a substantially flat round mandrel bottom, wherein each of said mandrel top and said mandrel bottom is sized so as to snugly fit within said interior space; and
a cylindrical mandrel height that connects said mandrel top and said mandrel bottom such that said mandrel height, said mandrel top, and said mandrel bottom are concentric;
at least two cord exits disposed through said height of said exterior.

15. The housing as claimed in claim 14, further comprising a box extending from said height of said exterior, wherein:
said box comprises:
a box top coplanar with and comprised by said first side;
a box bottom coplanar with and comprised by said second side; and
first, second, and third pieces extending between said box top and said box bottom,
wherein said first and third pieces intersect with said height and said second piece extends between said first and third pieces;
said division extends around said first, second, and third pieces; and
said at least two cord exits comprise:
a first cord exit disposed through one of said first piece and said third piece of said box; and
a second cord exit disposed through one of said first piece and said third piece of said box.

16. The housing as claimed in claim 15, wherein said second part further comprises a hole cover affixed to said second side over said hole in said second side and a hole lid comprising:
a lid piece sized and dimensioned to cover said hole in said first side of said exterior;
a hinge affixed to and between each of said first side and said lid piece, operable to move said lid piece between an open position wherein said lid piece is at an angle relative to said first side to a closed position wherein said lid piece is flush with said first side; and
a latch operable to removably secure said lid piece in said closed position.

* * * * *